(12) United States Patent
Vora et al.

(10) Patent No.: US 9,037,360 B2
(45) Date of Patent: May 19, 2015

(54) LOAD CONTROL FOR A MACHINE WITH A DUAL PATH ELECTRONICALLY CONTROLLED HYDROSTATIC TRANSMISSION

(71) Applicant: CNH AMERICA LLC, New Holland, PA (US)

(72) Inventors: Kushan Vora, Willowbrook, IL (US); Joseph R. Shoemaker, West Burlington, IA (US); David Schulte, Clarendon Hills, IL (US); Swapnil Tandel, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/066,057

(22) Filed: Oct. 29, 2013

(65) Prior Publication Data

US 2014/0180550 A1    Jun. 26, 2014

Related U.S. Application Data

(60) Provisional application No. 61/740,772, filed on Dec. 21, 2012, provisional application No. 61/740,750, filed on Dec. 21, 2012, provisional application No. 61/740,788, filed on Dec. 21, 2012, provisional application No. 61/740,811, filed on Dec. 21, 2012.

(51) Int. Cl.

| | |
|---|---|
| *F16H 61/40* | (2010.01) |
| *F16H 39/14* | (2006.01) |
| *B60W 10/00* | (2006.01) |
| *E02F 9/22* | (2006.01) |
| *F16H 61/431* | (2010.01) |
| *F16H 61/46* | (2010.01) |
| *E02F 3/84* | (2006.01) |

(52) U.S. Cl.
CPC .............. *F16H 39/14* (2013.01); *B60K 41/004* (2013.01); *E02F 9/2246* (2013.01); *E02F 9/2292* (2013.01); *F16H 61/431* (2013.01); *F16H 61/46* (2013.01); *E02F 3/841* (2013.01)

(58) Field of Classification Search
USPC .............. 701/50–51; 180/305, 307, 337–339; 477/34; 60/431
See application file for complete search history.

(56) References Cited

U.S. PATENT DOCUMENTS

| | | |
|---|---|---|
| 3,247,919 A | 4/1966 | Moon, Jr. |
| 3,795,107 A | 3/1974 | Ward |
| 3,914,938 A | 10/1975 | Cornell et al. |
| 4,019,596 A | 4/1977 | Crull |
| 4,023,637 A | 5/1977 | Jackovich |
| 4,086,767 A | 5/1978 | Byers, Jr. |
| 4,103,489 A | 8/1978 | Fletcher et al. |
| 4,399,886 A | 8/1983 | Pollman |
| 4,461,147 A | 7/1984 | Myers |
| 4,523,892 A | 6/1985 | Mitchell et al. |
| 4,531,601 A | 7/1985 | Barbagli |

(Continued)

*Primary Examiner* — Yonel Beaulieu
(74) *Attorney, Agent, or Firm* — Patrick M. Sheldrake; Seyed V. Sharifi T.

(57) ABSTRACT

A method of managing engine load by adjusting the pump and motor displacements of a dual path electronically controlled hydrostatic transmission utilizes the difference between the reference and actual engine speeds, the temperature of the working fluid for the dual path electronically controlled hydrostatic transmission, the engine governor droop value, the vehicle speed and lookup tables to determine pump and motor command adjustment factors associated with specific engine loading conditions.

20 Claims, 3 Drawing Sheets

(56) References Cited

U.S. PATENT DOCUMENTS

| | | |
|---|---|---|
| 4,534,707 A | 8/1985 | Mitchell |
| 4,739,616 A | 4/1988 | Myers |
| 4,932,208 A | 6/1990 | Koyama et al. |
| 5,001,900 A | 3/1991 | Sasajima et al. |
| 5,048,293 A | 9/1991 | Aoyagi |
| 5,177,964 A | 1/1993 | Tanaka et al. |
| 5,178,229 A | 1/1993 | Strenzke |
| 5,246,081 A | 9/1993 | Engle |
| 5,394,696 A | 3/1995 | Eich et al. |
| 5,419,128 A | 5/1995 | Asano et al. |
| 5,525,043 A * | 6/1996 | Lukich .................... 417/218 |
| 5,553,453 A | 9/1996 | Coutant et al. |
| 5,574,642 A | 11/1996 | Cooper |
| 5,590,041 A | 12/1996 | Cooper |
| 5,873,427 A | 2/1999 | Ferguson et al. |
| 6,644,429 B2 | 11/2003 | Evans et al. |
| 6,739,128 B2 | 5/2004 | Boyer et al. |
| 7,146,263 B2 | 12/2006 | Guven et al. |
| 7,147,078 B2 | 12/2006 | Teslak et al. |
| 7,210,293 B2 | 5/2007 | Fukasawa et al. |
| 7,287,620 B2 | 10/2007 | Thomas et al. |
| 7,469,534 B2 | 12/2008 | Nishi et al. |
| 7,930,843 B2 | 4/2011 | Hartwick |
| 8,020,659 B2 | 9/2011 | Schultz et al. |
| 2005/0177291 A1 | 8/2005 | Strashny et al. |
| 2006/0070746 A1 | 4/2006 | Lumpkins et al. |
| 2006/0191732 A1 * | 8/2006 | Lunzman et al. ............. 180/307 |
| 2010/0127654 A1 | 5/2010 | Anderson |
| 2010/0137102 A1 | 6/2010 | Sopko, Jr. et al. |
| 2010/0154403 A1 | 6/2010 | Brickner et al. |
| 2011/0202243 A1 | 8/2011 | Ishibashi et al. |
| 2012/0076670 A1 | 3/2012 | Rampen et al. |
| 2012/0152642 A1 | 6/2012 | Takahashi et al. |

* cited by examiner

LOAD CONTROL FOR A MACHINE WITH A DUAL PATH ELECTRONICALLY CONTROLLED HYDROSTATIC TRANSMISSION

CROSS-REFERENCE TO RELATED APPLICATIONS

This application claims the benefit of U.S. Provisional Application No. 61/740,772, filed Dec. 21, 2012, entitled LOAD CONTROL FOR MACHINES WITH HYDROSTATIC TRANSMISSION AND/OR IMPLEMENT SYSTEM, U.S. Provisional Application No. 61/740,750, filed Dec. 21, 2012, entitled STRAIGHT TRACKING CONTROL SYSTEM FOR A CRAWLER-TRACTOR, U.S. Provisional Application No. 61/740,788, filed Dec. 21, 2012, entitled CONTROL SYSTEM FOR A HYDROSTATIC SYSTEM, U.S. Provisional Application No. 61/740,811, filed Dec. 21, 2012, entitled CONTROL SYSTEM FOR A HYDROSTATIC SYSTEM USING SCALED RAMPS, which Applications are incorporated by reference herein in their entirety.

BACKGROUND

The present application relates generally to a control system for a machine with a dual path electronically controlled hydrostatic transmission. The present application relates more specifically to controlling the engine load of a machine with a dual path electronically controlled hydrostatic transmission.

One type of machine with a dual path electronically controlled hydrostatic transmission or a dual path electro-hydraulic transmission can be a crawler-tractor such as a bulldozer. "Bulldozers" or "dozers," as those terms may be used herein, refer to crawler-tractors that are equipped with a blade for scraping the ground or pushing material along the ground. The blade is pivotally connected to the crawler-tractor chassis such that it can pivot up and down. Blade controls are provided to the operator in the cab of the vehicle to permit the operator to raise and lower the blade with respect to the chassis of the crawler-tractor. One of the most common uses for blades on bulldozers is to level or otherwise contour the ground for the construction of houses, buildings, parking lots, and roads.

The dual path electronically controlled hydrostatic transmission can be used for the propulsion and steering of the bulldozer. Machines with dual path electronically controlled hydrostatic transmissions and/or implement systems, such as the bulldozer or other crawler-tractor, are often used for heavy duty operations including push-pull operations, lift-lower operations and/or digging operations. The load carrying capacity of these machines can be increased by managing the available power from the engine. In the absence of a good load management system, the engine may stall during high load conditions such as when performing heavy duty operations, climbing up-hill at high machine speeds or when performing many other similar types of operations.

Therefore, what is needed is a control system to efficiently manage engine load by controlling pump and motor displacements of a machine with a dual path electronically controlled hydrostatic transmission to prevent the engine from stalling.

SUMMARY

The present invention is directed to a method for controlling a machine with a dual path electronically controlled hydrostatic transmission. The method includes providing a machine having an engine and/or electric motor and a dual path electronically controlled hydrostatic transmission. The dual path electronically controlled hydrostatic transmission includes an input device and a drive system. The drive system has at least one pump and at least one motor. The input device provides drive commands for the at least one pump and at least one motor of the drive system. The method includes modifying the drive commands for the at least one pump and the at least one motor of the drive system based on at least one measured machine operating parameter and applying the modified drive commands to the at least one pump and/or at least one motor of the drive system to prevent the engine from stalling.

The present invention is also directed to a control system for a machine. The control system includes a first drive system having a first forward pump solenoid, a first reverse pump solenoid, a first motor solenoid, a first pump controlled by the first forward pump solenoid and the first reverse pump solenoid and a first motor controlled by the first motor solenoid and powered by the first pump. The control system also includes a second drive system having a second forward pump solenoid, a second reverse pump solenoid, a second motor solenoid, a second pump controlled by the second forward pump solenoid and the second reverse pump solenoid and a second motor controlled by the second motor solenoid and powered by the second pump. The control system includes an operator input device. The operator input device generates a command to control the first drive system and the second drive system in response to user manipulation of the operator input device. The control system also includes a control device to modify the first command and the second command based on at least one load control factor.

One embodiment of the present application is directed to a method of managing engine load by adjusting the pump and/or motor displacements of a dual path electronically controlled hydrostatic transmission by utilizing the difference between the reference and actual engine speeds, the temperature of the working fluid for the dual path electronically controlled hydrostatic transmission, the engine governor droop value, the vehicle speed and lookup tables that determine pump and motor command adjustment factors associated with specific control inputs.

One advantage of the present application is increased load carrying capacity of machines with dual path electronically controlled hydrostatic transmissions and/or hydraulic implement systems.

Another advantage of the present application is that it satisfies operator "feel" requirements for different machine operations such as heavy duty push-pull, lift-lower and/or digging operations or climbing up hills at high machine speeds with minimal or no engine lug-down.

A further advantage of the present application is that it can be used on any machine or system that includes a variable displacement hydraulic pump driven by any type of engine, electric motor and/or any other type of power source.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

In one exemplary embodiment, a machine with a dual path electronically controlled hydrostatic transmission (also referred to as a dual path electro-hydraulic transmission or ground drive system) can be a crawler-tractor. "Crawler-tractor" refers to any of the class of work vehicles or machines having a chassis, with an engine and ground-engaging endless-loop tracks that are located on either side of the chassis, that are driven by the engine, and that move the chassis over the ground. "Dozer" or "bulldozer" as used herein refers to a crawler-tractor coupled to a blade. Other examples of crawler-tractors can include harvesters, excavators and compact track loaders. Other examples of machines with dual path electronically controlled hydrostatic transmissions can include wheeled harvesters, wheeled excavators and wheeled compact loaders.

Figure 1:
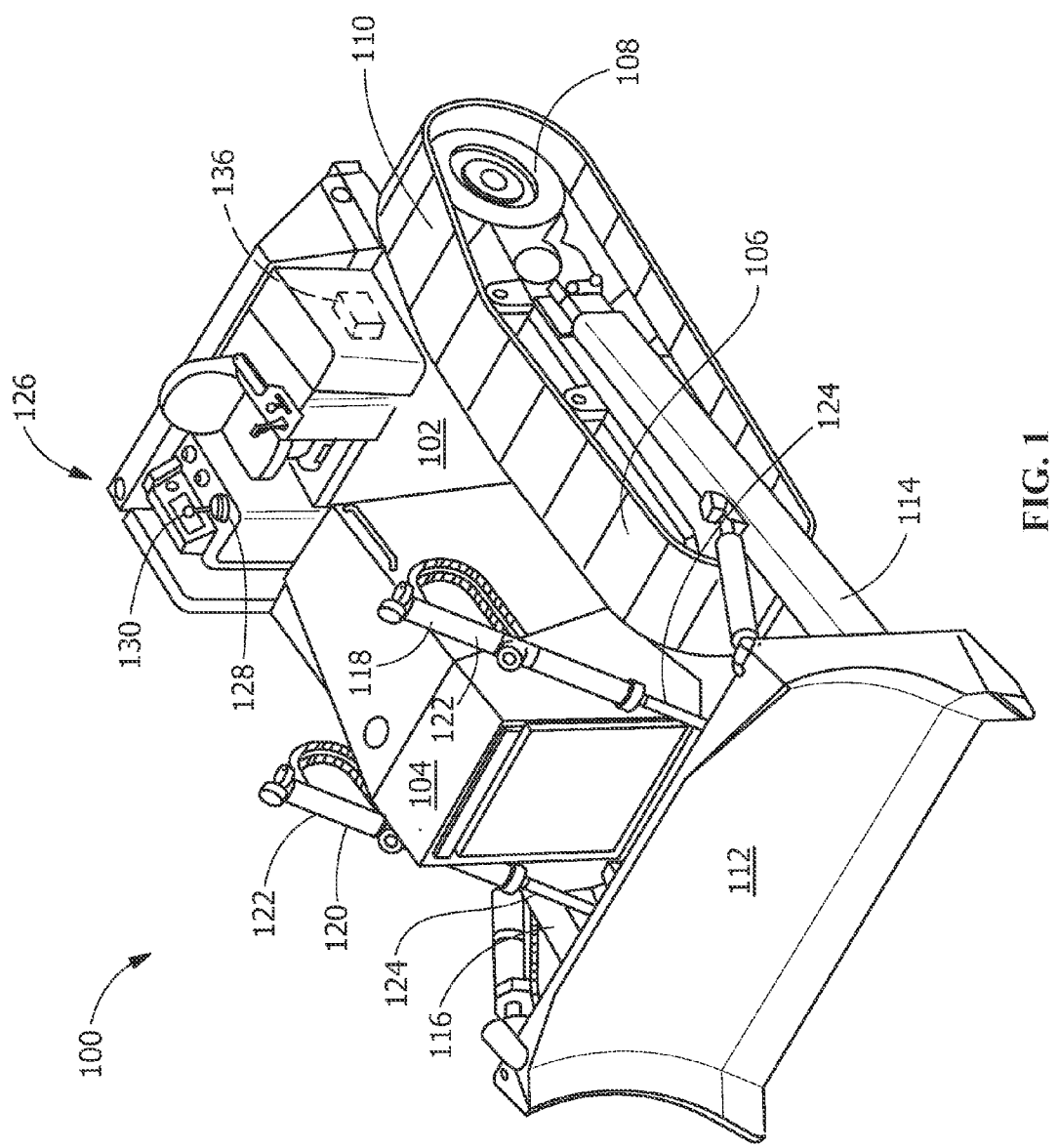
FIG. 1 shows a perspective view of an exemplary embodiment of a crawler-tractor.

Referring to FIG. 1, a crawler-tractor is shown. The crawler-tractor 100 includes a chassis 102 and an engine 104 fixed to the chassis 102. Crawler-tractor 100 also includes left side and right side drive systems 106, each of which includes a drive wheel 108 that is driven by a motor and an endless track 110 that is coupled to and driven by the drive wheel 108. The crawler-tractor 100 also includes a laterally extending blade 112 that is mounted to a left arm 114 and a right arm 116. Since the crawler-tractor shown in FIG. 1 includes a blade 112, the crawler-tractor 100 can also be referred to as a bulldozer or dozer 100. The arms 114, 116 of the dozer 100 can be pivotally coupled to the chassis 102 at the ends of the arms 114, 116 opposite the blade 112. The arms 114, 116 can be assisted in supporting the blade 112 by left and right hydraulic lift cylinders 118, 120. The left and right cylinder portions 122 of the hydraulic lift cylinders 118, 120 are coupled to the chassis 102 and the left and right rod ends 124 are coupled to the blade 112. When the operator extends or retracts cylinders 118, 120, the cylinders 118, 120 increase or decrease in length and lower or raise blade 112.

The operation of the dozer 100 can be controlled by an electronic controller 136. Electronic controller 136 can be a digital microprocessor-based controller having a RAM (random access memory), ROM (read only memory), CPU (central processing unit), sensor input and signal conditioning circuits, valve driver circuits, other memory devices, communications and interface circuits, and other control related components. The sensors and switches are coupled to the sensor input and signal conditioning circuits, the pilot valves and solenoids can be coupled to the valve driver circuits and other digital controllers can be coupled to the communications circuit. The ROM and other memory devices can store the CPU instructions that constitute the programs that are used in the operation of the dozer 100, the RAM and other memory devices can provide working space for the CPU to store values that change during operation, and the CPU executes the program instructions stored in ROM. All of these components can be coupled together by data, address and control buses in a conventional manner.

Dozer 100 has an operator's compartment or cab 126 from which the operator operates dozer 100. Among other controls, the cab 126 can include an operator input device 128 that the operator manipulates to steer and control the speed of the dozer 100. In one embodiment, the operator input device 128 can include a lever 130 with a neutral central position. Each of the left side and right side drive systems 106 are controlled with the operator input device 128. The operator input device 128 can be used to provide steering and speed control commands to each of the left side and right side drive systems 106 based on the "x-y" displacement of the operator input device 128 from the neutral (or center) position. In one embodiment, the operator can instruct the drive systems 106 by moving the input device 128 in one direction from neutral to move the machine or dozer 100 forward and can move the input device 128 in the other direction to move the machine or dozer 100 backward. By controlling the direction and amount that the operator input device 128 is moved from the neutral position, the operator can control the speed and direction of the machine or dozer 100.

Figure 2:
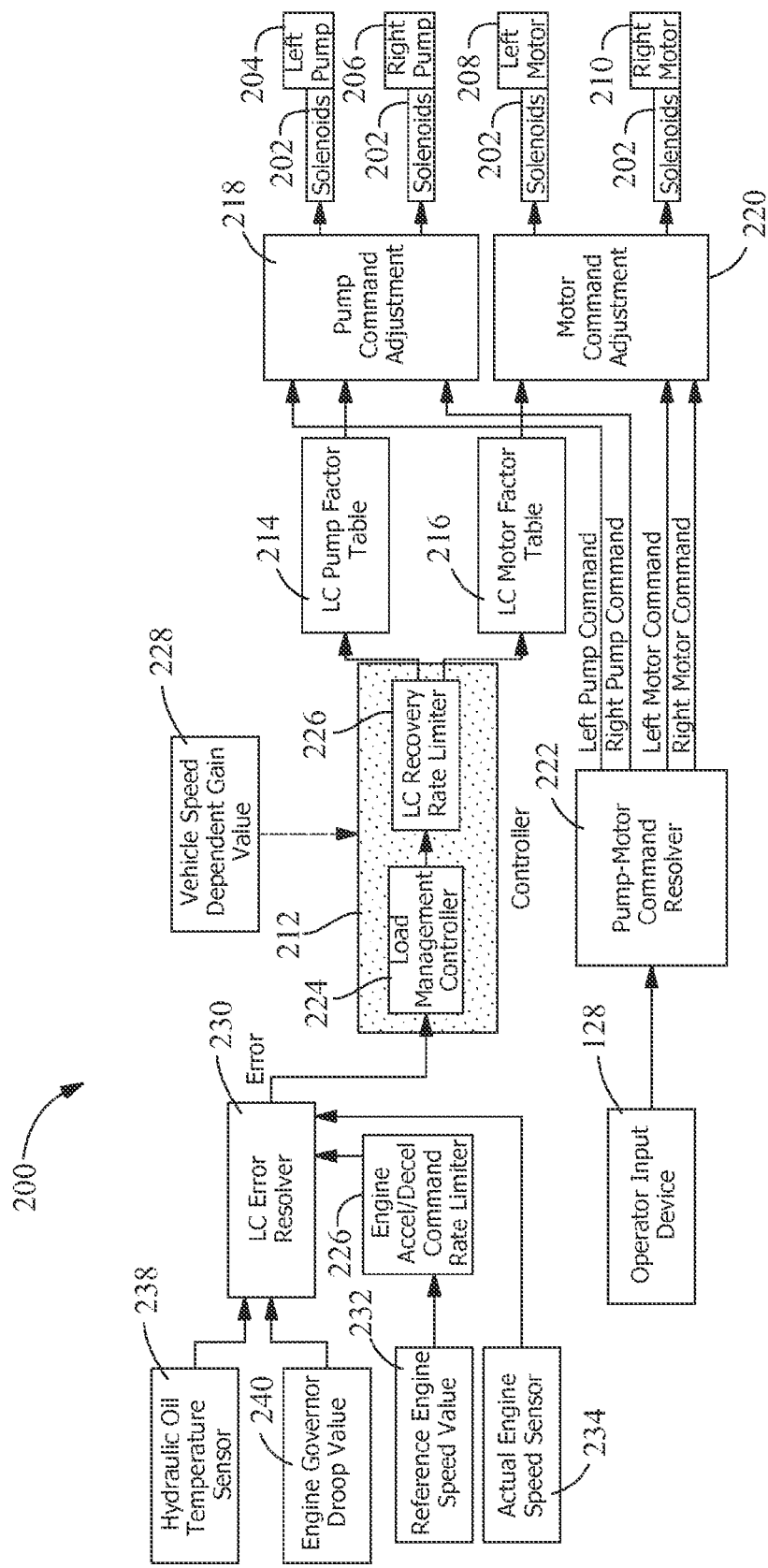
FIG. 2 shows a block diagram of an exemplary embodiment of a load control system for a dual path electronically controlled hydrostatic transmissions and/or hydraulic implement system.

FIG. 2 shows an embodiment of a load control system for a machine such as a crawler tractor or the dozer 100 with a dual path electronically controlled hydrostatic transmissions and/or hydraulic implement system. The load control system can operate to control the hydraulic flow for both the transmission system and the implement system of the machine. The load control system 200 can be part of the controller 136 either as an integrated system or a "stand-alone" subsystem. In another embodiment, the load control system 200 can be separate system that can operate with little or no interaction with controller 136.

The load control system 200 can be used to provide control signals or instructions to solenoids 202 that are used to control the displacement or operation of a left pump 204, a right pump 206, a left motor 208 and a right motor 210. The left pump 204 provides power to the left motor 208 which in turn drives a corresponding left drive wheel 108 and left track 110 (if a track vehicle). The right pump 206 provides power to the right motor 210 which in turn drives a corresponding right drive wheel 108 and right track 110 (if a track vehicle). In one exemplary embodiment, the left pump 204 and the right pump 206 can be controlled by forward and reverse solenoids 202. In another exemplary embodiment, the load control system 200, with certain modifications, can be used to control a variable displacement pump and/or a variable displacement motor, without solenoid control.

A controller 212 can be connected to or in communication with both a load control (LC) pump factor table or memory device 214 and an LC motor factor table or memory device 216. In one exemplary embodiment, LC pump factor table 214 and LC motor factor table 216 can use the same memory device. LC pump factor table 214 and LC motor factor table 216 can be lookup tables that are utilized to assist with the control of the displacement of pumps and motors in case of high engine load events. The LC pump and motor factor tables 214, 216 can be configured to provide precise control of pump and motor displacements and to meet minimum pump flow requirements during active load control conditions. The input to the LC pump factor table 214 and the LC motor factor table 216 can be a control value or signal from the controller 212. In one exemplary embodiment, the LC pump factor table 214 and the LC motor factor table 216 receive the same control value from the controller 212. In another embodiment, the LC pump factor table 214 and the LC motor factor table 216 can each receive a separate control value from the controller 212.

The control value or signal from the controller 212 can be used to determine an output value from each of the LC pump factor table 214 and the LC motor factor table 216. The output value from each of the LC pump factor table 214 and the LC motor factor table 216 can be a value ranging from 0% to 100% or a value ranging from 0 to 1. The output values from the LC pump factor table 214 and the LC motor factor table 216 can be used for the subsequent modification of the operator commands for the left pump 204 and left motor 208 and the right pump 206 and right motor 210.

The pump command adjustment control device 218 can receive left pump commands and right pump commands from a pump-motor command resolver 222 and the output value from the LC pump factor table 214. Similarly, the motor command adjustment control device 220 can receive left motor commands and right motor commands from the pump-motor command resolver 222 and the output value from the LC motor factor table 216. The pump command adjustment control device 218 can generate control signals or currents for the solenoids 202 of the left pump 204 and right pump 206 using the output value from the LC pump factor table 214 and the left and right pump commands from pump-motor command resolver 222. In one embodiment, the pump command adjustment control device 218 applies the output value from the LC pump factor table 214 to each of the left and right pump commands from pump-motor command resolver 222 to obtain adjusted displacement values. The adjusted displacement values are then converted into control signals or currents for the solenoids 202 of the left and right pumps 204, 206. The motor command adjustment control device 220 can generate control signals or currents for the solenoids 202 of the left motor 208 and right motor 210 using the output value from the LC motor factor table 216 and the left and right motor commands from pump-motor command resolver 222. In one embodiment, the motor command adjustment control device 220 applies the output value from the LC motor factor table 216 to each of the left and right motor commands from pump-motor command resolver 222 to obtain adjusted displacement values. The adjusted displacement values are then converted into control signals or currents for the solenoids 202 of the left and right motors 208, 210.

The pump-motor command resolver 222 receives drive commands from the operator input device 128 based on the operator's manipulations of the operator input device 128. The pump-motor command resolver 222 takes the drive commands and processes them to generate the left and right pump commands and the left and right motor commands for the pump command adjustment and motor command adjustment control devices 218, 220.

Referring back to controller 212, the controller 212 can include a load management controller 224 and a load control (LC) recovery rate limiter 226. The load management control or controller 224 can be a microprocessor based controller that can execute numerous algorithms, e.g., a proportional control algorithm, to generate or calculate an LC output signal to be provided to the LC recovery rate limiter 226. In one embodiment, the load management controller 224 can apply a gain amount from a memory device 228 to the input signal of the controller 212. The gain amount or value used by the load management controller 224 can be related to or correspond to one or more measured machine operating parameters such as the specific vehicle speed. The memory device 228 stores data correlating load management gain amounts to specific vehicle speeds (or speed ranges) in any suitable format including charts, graphs, tables, etc. The recovery rates of the pump and motor displacements can be controlled utilizing LC recovery rate limiter 226 included in the controller 212. The LC recovery rate limiter 226 can prevent any sudden changes in pump or motor displacements in response to a sudden removal of a load during or after an active load control event or condition.

A load control (LC) error resolver can provide an input signal or an error signal to the controller 212. In one exemplary embodiment, the error signal can be provided to the load management controller 224. The error signal to the controller 212 can be determined from one or more of a reference RPM (revolutions per minute) or engine speed value from an input device 232, such as a throttle, an actual RPM or engine speed value from a sensor 234, a hydraulic oil temperature from a hydraulic oil temperature sensor 238 and/or an engine governor droop signal or value 240 from an engine control unit. The engine governor droop parameter or signal can be used by the load management algorithm to prevent the load management algorithm from conflicting with engine fueling in order to avoid cyclic load management events. The consideration of hydraulic fluid temperature value in the load control algorithm can prevent undesirable load management events due to increases and decreases of the viscosity of the hydraulic fluid with respect to temperature.

In one exemplary embodiment, the reference RPM or engine speed value can be filtered before being provided to the LC error resolver 230 using a tunable rate limiter 236 to generate a rate limited reference RPM or engine speed value in order to prevent non-true load management events in response to sudden increase or decrease of engine acceleration or engine deceleration commands by the operator. In one exemplary embodiment, the LC error resolver 230 can include a load control droop calculator that can determine or calculate a load control droop value using the hydraulic oil temperature and the engine governor droop signal or value. The load control droop value, a rate limited reference RPM or engine speed value and the actual RPM or engine speed value can be utilized in the LC error resolver 230 to determine the error signal provided to the controller 212.

Figure 3:
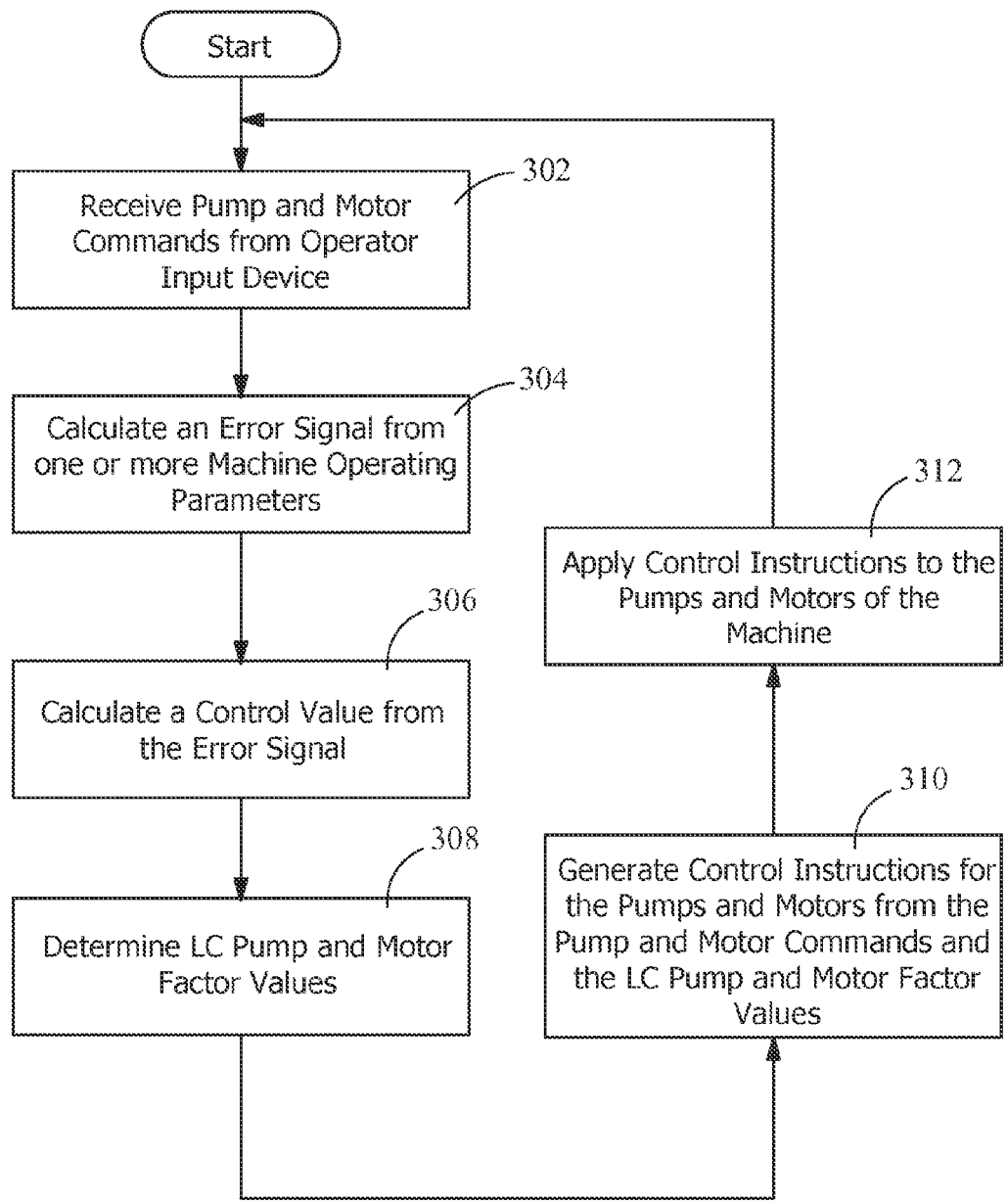
FIG. 3 shows an exemplary process for implementing load control on a machine.

FIG. 3 shows an exemplary process for implementing load management control on a machine or crawler-tractor. The process begins by receiving pump and motor commands from the operator input device 128 (step 302). An error signal can be determined or calculated from one or more system operating parameters, which may include an actual speed value, a reference speed value, an engine governor droop value and a hydraulic oil temperature value (step 304). The error signal can then be provided to the controller 212 to determine or calculate a control value or signal (step 306). The control value from the controller 212 can then be used to determine or calculate LC pump and motor factor values (step 308). Control instructions for the pumps and motors are generated using the LC pump and motor factor values and the pump and motor commands from the operator input device 128 (step 310). The generated control instructions are then applied to the pumps and motors of the machine (step 312).

In one exemplary embodiment, the memory device 228 can include a load management control gain scheduling algorithm for at least two different modes of machine operations. For example, the load management control gain scheduling algorithm can calculate and apply more aggressive control gains for heavy duty push-pull, digging and/or lift-lower operations performed at low or medium speeds than for traveling on flat ground or inclined-up surfaces at higher vehicle speeds.

In one exemplary embodiment, the hydraulic fluid temperature and/or the vehicle speed and/or the engine governor droop value can be used as a governing factor to modify the command signals to the pumps and/or motors to prevent the engine from stalling. In another exemplary embodiment, specific pump and/or motor displacement lookup tables can be used to obtain specific vehicle performance during high load conditions. In a further exemplary embodiment, a rate limiter can be used to stabilize the system and prevent cyclic load management events. In an exemplary embodiment, a rate limiter on the reference engine RPM input can be used to prevent an erroneous load management response during rapid throttle movement.

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any non-transitory machine-readable media for accomplishing its operations. The embodiments of the present application may be implemented using existing computer processors, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

In the further consideration of the drawings of this application and the discussion of such drawings and the elements shown therein, it should also be understood and appreciated that, for purposes of clarity in the drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already be widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A method of controlling a machine with a dual path electronically controlled hydrostatic transmission, the method comprising:
   providing the machine having an engine and a dual path electronically controlled hydrostatic transmission, the hydrostatic transmission including an input device and a drive system, the drive system having at least one pump and at least one motor, the input device providing drive commands for the at least one pump and at least one motor of the drive system;
   modifying the drive commands for the at least one pump and the at least one motor of the drive system based on at least one measured machine operating parameter;
   supplying a load control recovery rate limiter to prevent displacement of the at least one pump upon load removal, based on previously stored data; and
   applying the modified drive commands to the at least one pump and the at least one motor of the drive system to prevent the engine from stalling.

2. The method of claim 1 wherein said modifying the drive commands for the at least one pump and the at least one motor includes:
   modifying the drive commands for the at least one pump of the drive system based on a pump load control factor value; and
   modifying the drive commands for the at least one motor of the drive system based on a motor load control factor value.

3. The method of claim 2 wherein said modifying the drive commands for the at least one pump and the at least one motor includes calculating a control value to determine the pump load control factor value and the motor load control factor value based on an error signal.

4. The method of claim 3 wherein:
said modifying the drive commands for the at least one pump includes determining the load control pump factor value from a load control pump factor table utilizing the calculated control value; and
said modifying the drive commands for the at least one motor includes determining the load control motor factor output value from a load control motor factor table utilizing the calculated control value.

5. The method of claim 3 wherein said calculating a control value includes:
applying a gain amount to the error signal, the gain amount being dependent on one or more measured machine operating parameters; and
providing the gain adjusted error signal to a recovery rate limiter to generate the control value.

6. The method of claim 3 wherein said modifying the drive commands for the at least one pump and the at least one motor includes calculating an error signal based on one or more of hydraulic fluid temperature, reference engine speed, actual engine speed or engine governor droop.

7. The method of claim 6 wherein said calculating an error signal includes providing the reference engine speed to a rate limiter to generate a rate limited reference engine speed used to calculate the error signal.

8. The method of claim 5 wherein applying a gain amount to the error signal includes executing a load control algorithm.

9. The method of claim 1 wherein the at least one measured machine operating parameter is selected from the group consisting of hydraulic fluid temperature, vehicle speed, reference engine speed, actual engine speed, engine governor droop and combinations thereof.

10. The method of claim 1 wherein said applying the modified drive commands to the at least one pump and the at least one motor includes applying the modified drive commands to a solenoid associated with each of the at least one pump and the at least one motor of the drive system.

11. A control system for a machine comprising:
a first drive system comprising:
a first forward pump solenoid;
a first reverse pump solenoid;
a first motor solenoid;
a first pump controlled by the first forward pump solenoid and the first reverse pump solenoid; and
a first motor controlled by the first motor solenoid and powered by the first pump;
a second drive system comprising:
a second forward pump solenoid;
a second reverse pump solenoid;
a second motor solenoid;
a second pump controlled by the second forward pump solenoid and the second reverse pump solenoid; and
a second motor controlled by the second motor solenoid and powered by the second pump;
an operator input device, the operator input device generating a command to control the first drive system and the second drive system in response to user manipulation of the operator input device;
a control device to modify the first command and the second command based on at least one load control factor, and
a load control recovery rate limiter that prevents displacement for the first pump and the second pump based on previously stored data.

12. The control system of claim 11 further comprising a pump-motor command resolver, the pump-motor command resolver converting the command to a first pump command, a first motor command, a second pump command and a second motor command.

13. The control system of claim 12 wherein the control device comprises:
a pump command adjustment control device, the pump command adjustment control device modifies the first pump command and the second pump command; and
a motor command adjustment control device, the motor command adjustment control device modifies the first motor command and the second motor command.

14. The control system of claim 13 further comprising:
a load control pump factor table;
a load control motor factor table; and
the at least one load control factor comprising a load control pump factor value selected from the load control pump factor table and provided to the pump command adjustment control device and a load control motor factor value selected from the load control motor factor table and provided to the motor command adjustment device.

15. The control system of claim 14 further comprising a controller to generate a control value, the control value being provided to the load control pump factor table to select the load control pump factor value and being provided to the load control motor factor table to select the load control motor factor value.

16. The control system of claim 15 wherein the controller comprises a load management controller to apply a gain value to an error signal and a recovery rate limiter to generate the control value based on the gain adjusted error signal.

17. The control system of claim 16 wherein the gain value applied to the error signal is based on one or more measured machine operating parameters.

18. The control system of claim 16 further comprising an error resolver to generate the error signal in response to at least one operating parameter of the machine.

19. The control system of claim 18 wherein the at least one operating parameter is selected from the group consisting of hydraulic fluid temperature, reference engine speed, actual engine speed, engine governor droop and combinations thereof.

20. The control system of claim 19 further comprising a reference engine speed rate limiter to modify the reference engine speed before providing the rate limited reference engine speed to the error resolver.

* * * * *